(12) United States Patent
Maduta et al.

(10) Patent No.: US 12,030,065 B2
(45) Date of Patent: Jul. 9, 2024

(54) CYCLONE SEPARATOR ARRANGEMENT

(71) Applicant: METSO METALS OY, Espoo (FI)

(72) Inventors: Robert Maduta, Hemsbach (DE); Peter Sturm, Karben (DE); Linus Perander, Sandefjord (NO); Theodor Beisheim, Frankfurt am Main (DE)

(73) Assignee: METSO METALS OY, Espoo (FI)

( * ) Notice: Subject to any disclaimer, the term of this patent is extended or adjusted under 35 U.S.C. 154(b) by 0 days.

(21) Appl. No.: 17/902,841

(22) Filed: Sep. 4, 2022

(65) Prior Publication Data
US 2023/0001432 A1    Jan. 5, 2023

Related U.S. Application Data

(63) Continuation of application No. PCT/FI2020/050145, filed on Mar. 6, 2020.

(51) Int. Cl.
*B04C 9/00* (2006.01)
*B04C 5/04* (2006.01)
*B04C 5/081* (2006.01)

(52) U.S. Cl.
CPC ............ *B04C 9/00* (2013.01); *B04C 5/04* (2013.01); *B04C 5/081* (2013.01)

(58) Field of Classification Search
CPC ... B04C 9/00; B04C 5/04; B04C 5/081; B01J 8/0055; F23J 15/027
See application file for complete search history.

(56) References Cited

U.S. PATENT DOCUMENTS

| | | | | |
|---|---|---|---|---|
| 2,039,692 A | * | 5/1936 | Hermannus | B04C 7/00 |
| | | | | 209/710 |
| 3,091,334 A | * | 5/1963 | Morton | B04C 5/04 |
| | | | | 209/730 |
| 3,313,413 A | * | 4/1967 | Delcellier | D21D 5/18 |
| | | | | 209/733 |
| 3,672,503 A | * | 6/1972 | Mark | B04C 7/00 |
| | | | | 209/722 |

(Continued)

FOREIGN PATENT DOCUMENTS

| | | | |
|---|---|---|---|
| CN | 102052684 A | 5/2011 | |
| JP | 2016151196 A | * 8/2016 | ............ B04C 5/04 |
| WO | 2015031429 A1 | 3/2015 | |

OTHER PUBLICATIONS

International Search Report issued by the Finnish Patent and Registration Office acting as the International Searching Authority in relation to International Application No. PCT/FI2020/050145 dated Jun. 11, 2020 (5 pages).

(Continued)

*Primary Examiner* — Dung H Bui
(74) *Attorney, Agent, or Firm* — Robert P. Michal, Esq.; Carter, DeLuca & Farrell LLP (57) ABSTRACT

A cyclone separator arrangement includes a preceding apparatus having an outlet, and a cyclone separator having an inlet. The arrangement further includes a crossover duct connected to the outlet and the inlet for supplying gas flow including particles from the preceding apparatus to the cyclone separator. The preceding apparatus has a horizontal inner diameter (D), and a flow channel having a cross-section having a height (H) and a width (d), said width (d) relating to the inner diameter (D) such that 0.15×D<d<0.6× D.

14 Claims, 5 Drawing Sheets

(56) References Cited

U.S. PATENT DOCUMENTS

| | | | | |
|---|---|---|---|---|
| 3,738,090 A * | 6/1973 | Kilian | B04C 5/04 | 415/121.2 |
| 4,055,486 A * | 10/1977 | Choi | C10B 49/20 | 209/474 |
| 4,066,533 A * | 1/1978 | Myers | B01D 45/00 | 95/271 |
| 4,572,780 A * | 2/1986 | Owen | B01J 8/0055 | 422/144 |
| 4,606,739 A * | 8/1986 | Brannstrom | B04C 9/00 | 95/271 |
| 4,649,703 A * | 3/1987 | Dettling | B03C 3/41 | 60/275 |
| 4,662,909 A * | 5/1987 | Durr | B04C 9/00 | 55/459.2 |
| 4,670,410 A * | 6/1987 | Baillie | B01J 38/38 | 95/271 |
| 5,078,100 A * | 1/1992 | Huschauer | F23C 10/28 | 110/190 |
| 5,180,486 A * | 1/1993 | Smolensky | B01D 45/12 | 210/512.1 |
| 5,203,284 A | 4/1993 | Dietz | | |
| 5,275,641 A | 1/1994 | Tammera et al. | | |
| 5,518,695 A * | 5/1996 | Goodspeed | B04C 5/02 | 55/318 |
| 5,771,844 A * | 6/1998 | Dietz | B01J 8/0055 | 55/459.1 |
| 6,238,579 B1 * | 5/2001 | Paxton | B01D 21/2411 | 209/733 |
| 6,322,601 B1 | 11/2001 | Semedard et al. | | |
| 6,530,484 B1 * | 3/2003 | Bosman | B01D 21/2416 | 209/733 |
| 6,706,095 B2 * | 3/2004 | Morgan | A47L 9/1683 | 55/459.1 |
| 6,814,941 B1 | 11/2004 | Naunheimer et al. | | |
| 6,846,463 B1 * | 1/2005 | Dries | C10G 11/18 | 422/147 |
| 7,316,564 B2 * | 1/2008 | Muschelknautz | B01J 8/388 | 432/16 |
| 2005/0126394 A1 * | 6/2005 | Reiling | B01J 8/0055 | 95/271 |
| 2007/0068127 A1 * | 3/2007 | Noguchi | B04C 5/28 | 55/459.1 |
| 2010/0307969 A1 * | 12/2010 | Backman | B04C 5/081 | 210/512.1 |
| 2012/0269688 A1 * | 10/2012 | Erler | B04C 5/04 | 422/147 |
| 2013/0055936 A1 * | 3/2013 | Vimalchand | B01J 8/388 | 110/297 |
| 2013/0199137 A1 * | 8/2013 | Hallgren | B01D 46/48 | 55/393 |
| 2014/0270997 A1 * | 9/2014 | Sundholm | B65G 53/60 | 406/157 |
| 2015/0033944 A1 * | 2/2015 | Luven | B04C 5/20 | 95/268 |
| 2015/0096946 A1 * | 4/2015 | Dunman | B03D 1/1418 | 210/194 |
| 2016/0271627 A1 * | 9/2016 | Chirtu | B04C 5/28 | |
| 2016/0368004 A1 * | 12/2016 | Ribera Salcedo | B04C 5/081 | |
| 2018/0056307 A1 * | 3/2018 | Pettersson | B04C 5/081 | |

OTHER PUBLICATIONS

Written Opinion of the International Searching Authority issued by the Finnish Patent and Registration Office acting as the International Searching Authority in relation to International Application No. PCT/FI2020/050145 dated Jun. 11, 2020 (7 pages).

International Preliminary Report on Patentability issued by the European Patent Office acting as the International Preliminary Examining Authority in relation to International Application No. PCT/FI2020/050145 dated Nov. 4, 2021 (13 pages).

Eurasian Office Action dated Mar. 21, 2023 (5 pages) and English translation (4 pages), issued in corresponding Eurasian Appln. No. 202291972, 9 pages.

L.M. Isyanov, et al, "Fundamentals of designing dust collecting installations for purification of ventilation emissions", Ministry of Eduction and Science of the Russian Federation Federal State Budget Educational Institution of Higher Education "Saint-Petersburg State University of Industrial Technologies and Design" Higher School of Technology and Energy, Principles of Design of Dust Collectors for Cleaning Ventilation Emissions, 2016 Cover page plus pp. 1-50 (51 pages in total); available in the Internet at the link www.nizrp.narod.ru/metod/kafoxrokrsr/14.pdf?ysclid=lfaoqfomdx224464812.

* cited by examiner

CYCLONE SEPARATOR ARRANGEMENT

CROSS-REFERENCE TO RELATED APPLICATIONS

This application is a continuation of PCT International Application No. PCT/FI2020/050145 filed Mar. 6, 2020, the disclosure of this application is expressly incorporated herein by reference in its entirety.

BACKGROUND

The invention relates to a cyclone separator arrangement, comprising a preceding apparatus having an outlet and a cyclone separator having an inlet.

Cyclone separators are widely used for separating or removing particles from gas flow generated e.g. in a reactor, a furnace, an oven, or a venturi. However, there is still a need for improve the efficiency of the cyclone separators.

BRIEF DESCRIPTION

Viewed from a first aspect, there can be provided a cyclone separator arrangement, comprising
a preceding apparatus having an outlet, and
a cyclone separator having an inlet, the arrangement further comprising
a crossover duct connected to the outlet and the inlet for supplying gas flow comprising particles from the preceding apparatus to the cyclone separator, wherein
the crossover duct creates a flow channel from the outlet to the inlet,
the preceding apparatus has a horizontal inner diameter, and
the flow channel having a cross-section having a height H and a width d, said width d relating to the inner diameter D such that $0.15 \times D < d < 0.6 \times D$, wherein
the width d is a dimension of the flow channel in a horizontal plane crossing the centre of gravity of a flow-through area of the flow channel at the outlet of the preceding apparatus,
wherein
the inner diameter D is a width of the preceding apparatus in a horizontal plane crossing the centre of gravity of a flow-through area of the preceding apparatus and being parallel to the width d of the flow channel, and that
the flow channel is arranged asymmetrically in a horizontal cross-section of the preceding apparatus.

Thereby a cyclone separator arrangement providing improved efficiency may be achieved.

The arrangement and the method are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the horizontal cross-section of the preceding apparatus has a round shape, and the crossover duct is arranged to the round preceding apparatus so that a distal wall of the crossover duct is tangentially directed in respect of the preceding apparatus. An advantage is that the separation efficiency of the cyclone separator may be improved by guiding/pushing particles towards the outer wall of said guiding separator already at the outlet of the preceding apparatus.

In one embodiment, the horizontal cross-section of the preceding apparatus has a round shape, and the distal wall has an offset in respect of the preceding apparatus, the offset being no more than $0.1 \times D$ from a tangential plane of the preceding apparatus. An advantage is that the separation efficiency of the cyclone separator may be improved by guiding/pushing particles towards the outer wall of said guiding separator already at the outlet of the preceding apparatus.

In one embodiment, the cross-sectional shape of the preceding apparatus is polygon, e.g. rectangle or square, and that the crossover duct is arranged at a vertical edge of the preceding apparatus so that a distal wall of the crossover duct is attached to said vertical edge. An advantage is that the separation efficiency of the cyclone separator may be improved by guiding/pushing particles towards the outer wall of said guiding separator already at the outlet of the preceding apparatus.

In one embodiment, the cross-sectional shape of the preceding apparatus is polygon, e.g. rectangle or square, and a distal wall of the crossover duct has an offset in respect of a vertical edge of the preceding apparatus, the offset being no more than $0.1 \times D$ from said vertical edge. An advantage is that the separation efficiency of the cyclone separator may be improved by guiding/pushing particles towards the outer wall of said guiding separator already at the outlet of the preceding apparatus.

In one embodiment, the cross-sectional shape of the preceding apparatus is polygon, e.g. rectangle or square, and the distal wall of the crossover duct is perpendicular to an outlet wall of the preceding apparatus that comprises the outlet. An advantage is that it is very easy to be constructed.

In one embodiment, a relation of the height H of the crossover duct to the width d thereof is $H/d < 3.75$ at the outlet. An advantage is that the duct flow-through section has a relatively narrow shape, thus guiding the particles away from the cyclone gas outlet.

In one embodiment, the cross-sectional area of the crossover duct decreases towards the inlet. An advantage is that velocity of gas flow in the cross-over duct may be accelerated.

In one embodiment, the width of the crossover duct is decreasing towards the inlet. An advantage is that the particles are guided further away from the gas outlet in the cyclone separator. The angle leading to a decreased width pushes the particles further towards the cyclone outer wall where gas solid separation can take place.

In one embodiment, the width of the crossover duct is decreasing towards the inlet so that a proximal wall of the crossover duct is arranged at a first angle α in relation to a distal wall thereof, wherein the first angle $α < 40°$. An advantage is that the particles are guided further away from the gas outlet in the cyclone separator. The angle leading to a decreased width pushes the particles further towards the cyclone outer wall where gas solid separation can take place.

In one embodiment, a bump is arranged in the flow channel for limiting the cross-sectional area of the flow channel. An advantage is that the separation efficiency of the cyclone separator may be enhanced.

In one embodiment, the height h of the bump in relation to width d of the flow channel is selected as: h/d<0.3. An advantage is that the flow-through area is not largely occupied by the bump, thus pressure losses do not increase significantly.

In one embodiment, the length l of the bump 11 in relation to height h thereof is selected as: l/h<4. An advantage is that there is enough space left till the cyclone separator inlet is reached, thus allowing the flow to expand back which reduces pressure losses while the particles do not easily expand back due to their inertia.

In one embodiment, the preceding apparatus is a venturi apparatus having a round cross-section, the venturi apparatus comprising a feeding channel arrangement for feeding material in the venturi apparatus, wherein the feeding channel arrangement comprises one or more feeding channel(s) arranged, as seen from above, at a second angle β in relation to the direction of the distal wall of the crossover duct, wherein said second angle β is selected in range of 90°±70°. An advantage is that the separation efficiency of the cyclone separator connected to the venturi apparatus may be enhanced.

In one embodiment, the feeding channel arrangement of the venturi apparatus comprises one feeding channel only. An advantage is that the feeding channel arrangement has a simple and light structure.

In one embodiment, the feeding channel arrangement comprises at least two feeding channels. An advantage is that this may provide more flexibility to a plant layout and, if necessary, feeding of two or more materials to be mixed in the preceding apparatus may be promoted.

In one embodiment, the feeding channel arrangement is arranged on same side of a centre line of the venturi apparatus as the crossover duct. An advantage is that the mixing in the venturi is enhanced and also the separation efficiency of the cyclone separator connected to the venturi apparatus may be enhanced, especially when gas flow has a high bulk velocity, meaning that bulk velocity >5 m/s in the feeding channel, preferably >6 m/s, even more preferably >7 m/s.

In one embodiment, the feeding channel arrangement is arranged on opposite side of a centre line of the venturi apparatus as the crossover duct. An advantage is that the mixing in the venturi is enhanced and also the separation efficiency of the cyclone separator connected to the venturi apparatus may be enhanced, especially when gas flow has a low bulk velocity, meaning that bulk velocity <5 m/s in the feeding channel, preferably <4 m/s.

In one embodiment, the venturi apparatus has an expanded upper portion, and that the outlet is arranged to said expanded upper portion. An advantage is that the venturi enhances mixing due to the expansion and resulting turbulence/recirculation.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figures 1A, 1B:
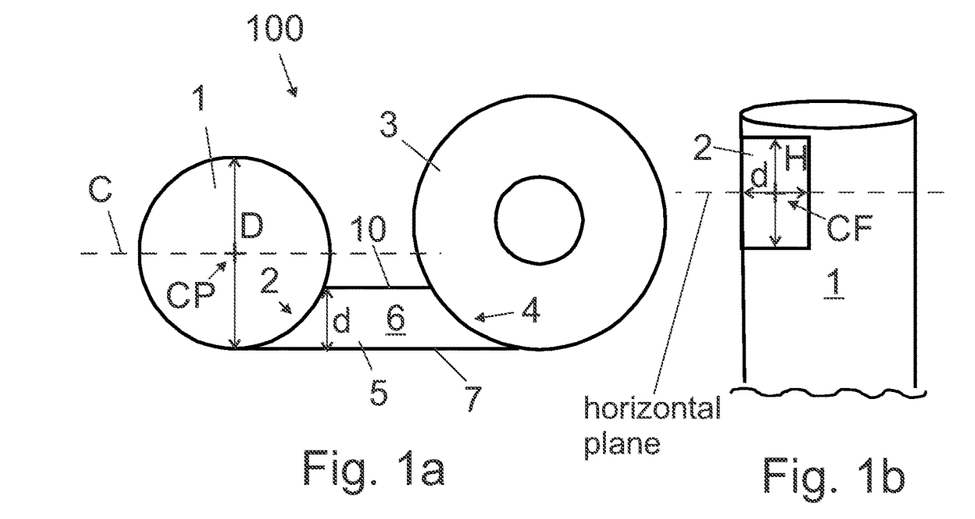
FIG. 1a is a schematic top view of a cyclone separator arrangement in partial cross-section.
FIG. 1b is a schematic side view of the arrangement shown in Figure lain partial cross-section.

FIG. 1a is a schematic top view of a cyclone separator arrangement in partial cross-section, and FIG. 1b is a schematic side view of the arrangement shown in Figure lain partial cross-section.

The cyclone separator arrangement 100 comprises a preceding apparatus 1 having an outlet 2, a cyclone separator 3 having an inlet 4, and a crossover duct 5 connected to the outlet 2 and the inlet 4. According to an aspect, the preceding apparatus 1 is a reactor, a furnace, an oven, or a venturi. The preceding apparatus 1 has a horizontal inner diameter D.

The crossover duct 5 creates a flow channel 6 from the outlet 2 of the preceding apparatus 1 to the inlet 4 of the cyclone separator 3 and supplies gas flow comprising particles from the preceding apparatus 1 to the cyclone separator 3.

The flow channel 6 is arranged asymmetrically in a horizontal cross-section of the preceding apparatus 1.

The flow channel 6 has a cross-section having a height H and a width d at the outlet 2 of the preceding apparatus 1. The width d of the flow channel 6 relates to the inner diameter D of the preceding apparatus 1 such that $0.15 \times D < d < 0.6 \times D$, preferably $0.175 \times D < d < 0.6 \times D$, even more preferably $0.2 \times D < d < 0.6 \times D$.

The wider the flow channel 6 at its inlet, i.e. at the outlet 2 of the preceding apparatus, (a higher value before the <d), the smaller the pressure losses are. However, the flow channel 6 at its inlet should not be too wide, because then the particles are not thrown towards the opposite duct wall and separation efficiency of the cyclone apparatus 1 is not enhanced.

The width d of the flow channel 6 is a dimension of the flow channel 6 in a horizontal plane crossing the centre of gravity CF of a flow-through area of the flow channel 6 at the outlet 2 of the preceding apparatus.

The inner diameter D is a dimension of the preceding apparatus 1 in a horizontal plane crossing the centre of gravity CP of a flow-through area of the preceding apparatus 1 and being parallel to the width d of the flow channel 6. In an embodiment, said horizontal plane is situated somewhere between upper and lower walls of cross over duct 5.

Figure 13A:
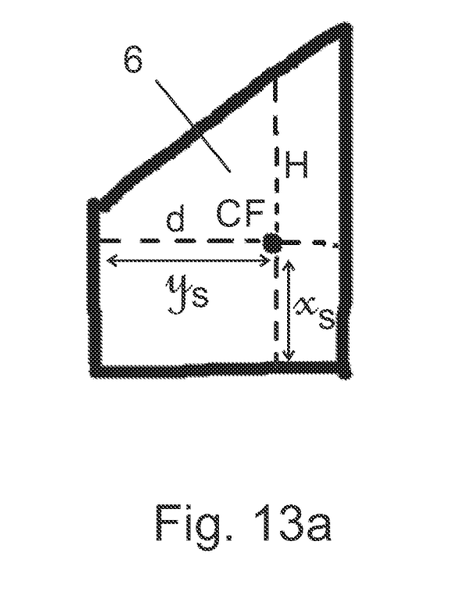
FIG. 13a shows principles for defining certain dimensions of a flow channel.
Figure 13B:
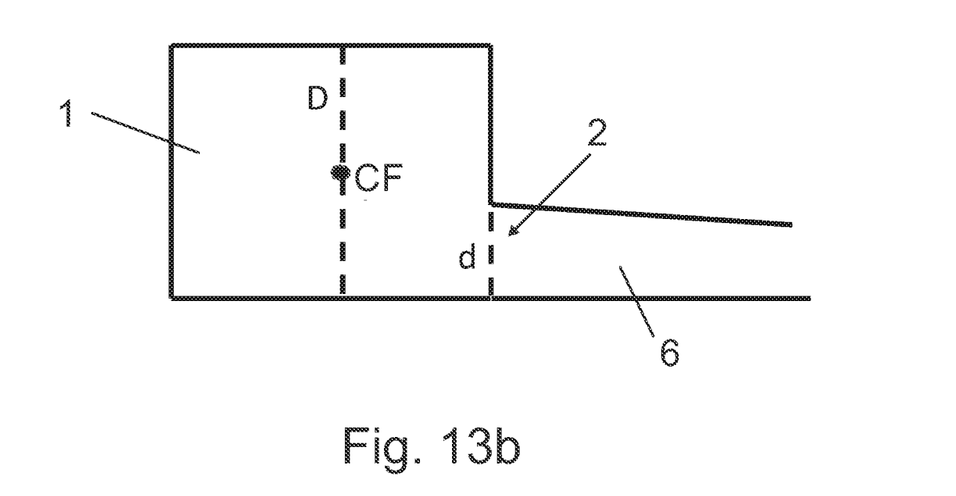
FIG. 13b shows principles for defining certain dimensions of a preceding apparatus.

FIGS. 13a and 13b are showing general principles for defining values of d and D.

In an embodiment, a relation of the height H of the crossover duct 5 to the width d thereof is H/d <3.75 at the outlet 2, such as 1<H/d<3.75. Thus, the flow channel 6 has a relatively narrow shape, guiding the particles away from the gas outlet of the cyclone apparatus. However, the flow channel 6 is not too narrow, thus allowing the particles at the outlet 2 of the preceding apparatus to be directed towards the duct wall.

In an embodiment, the horizontal cross-section of the preceding apparatus 1 has a round shape. In an embodiment, such as shown in FIG. 1a, the crossover duct 5 is arranged to the round preceding apparatus 1 so that a distal wall 7 of the crossover duct 5 is tangentially directed in respect of the preceding apparatus 1.

Figure 2:
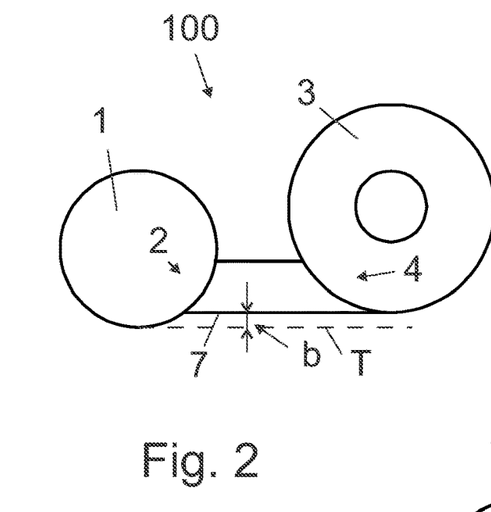
FIG. 2 is a schematic top view of another cyclone separator arrangement in partial cross-section.

FIG. 2 is a schematic top view of another cyclone separator arrangement in partial cross-section.

In an embodiment of an arrangement where the preceding apparatus 1 has a round shape, the distal wall 7 has an offset b in respect of the preceding apparatus 1. In an embodiment, the offset b is no more than 0.1×D from a tangential plane T of the preceding apparatus 1.

Figure 3:
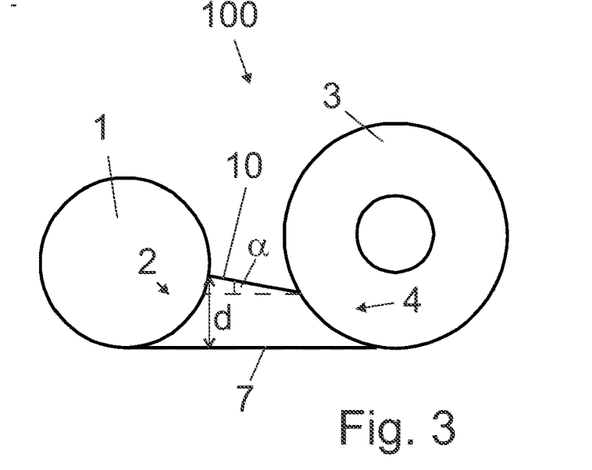
FIG. 3 is a schematic top view of a third cyclone separator arrangement in partial cross-section.

FIG. 3 is a schematic top view of a third cyclone separator arrangement in partial cross-section.

In an embodiment, the cross-sectional area of the crossover duct 5 decreases towards the inlet 4.

In an embodiment, the width d is decreasing towards the inlet 4. In an embodiment, such as shown in FIG. 3, a proximal wall 10 of the crossover duct 5 is arranged at a first angle α in relation to a distal wall 7 thereof, wherein the first angle α<40°. In another embodiment, the first angle α<35°.

Figure 4:
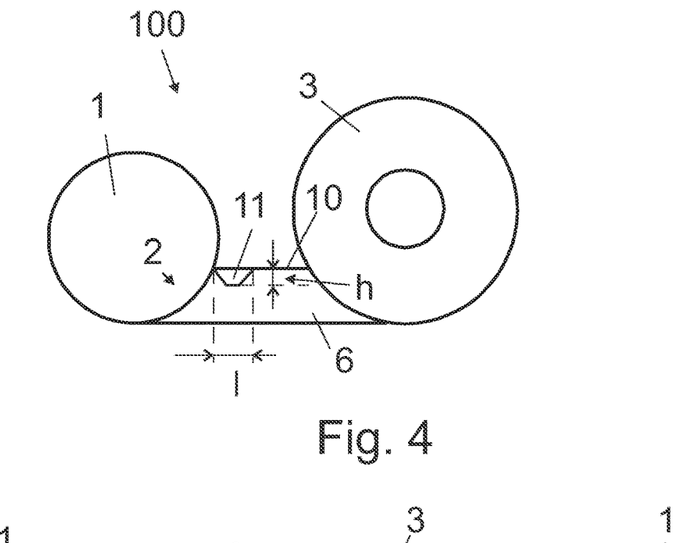
FIG. 4 is a schematic top view of a fourth cyclone separator arrangement in partial cross-section.

FIG. 4 is a schematic top view of a fourth cyclone separator arrangement in partial cross-section.

In an embodiment, the arrangement 100 comprises a bump 11 arranged in the flow channel 6. The bump 11 limits the cross-sectional area of the flow channel 6. In an embodiment, the bump 11 is attached to the crossover duct 5 by e.g. welding. In another embodiment, the bump 11 is an integral part of the crossover duct 5, i.e. shaped to the material of the crossover duct 5.

In an embodiment, the bump 11 is arranged to the proximal wall 10 of the crossover duct 5.

In an embodiment, relation of height h of the bump 11 to width d of the flow channel 6 is h/d<0.3, preferably h/d<0.25.

In an embodiment, relation of length l to height h of the bump 11 is l/h<4, preferably l/h<3.

Figure 5A:
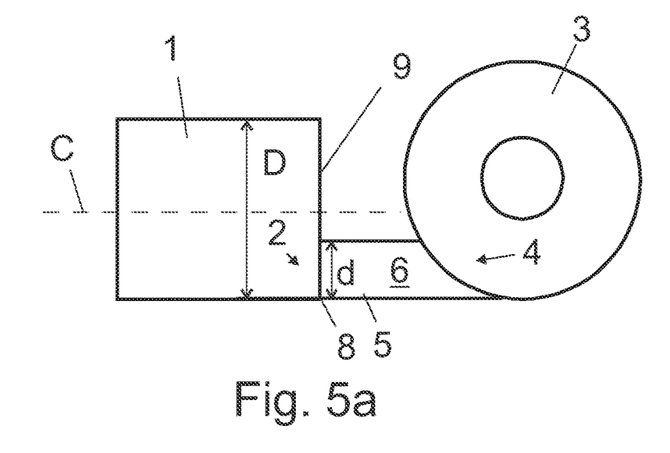
FIG. 5a is a schematic top view of a fifth cyclone separator arrangement in partial cross-section.
Figure 5B:
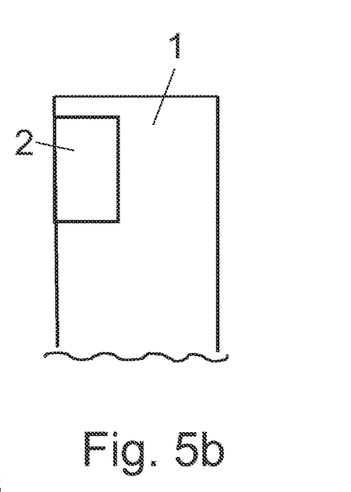
FIG. 5b is a schematic side view of the arrangement shown in Figure Sa in partial cross-section.

Figure 5a is a schematic top view of a fifth cyclone separator arrangement in partial cross-section, and FIG. 5b is a schematic side view of the arrangement shown in FIG. 5a in partial cross-section.

In an embodiment, the cross-sectional shape of the preceding apparatus 1 is polygon, such as rectangle.

In an embodiment, such as shown in FIG. 5a, the cross-sectional shape of the preceding apparatus 1 is square.

In an embodiment, the crossover duct 5 is arranged at a vertical edge 8 of the preceding apparatus 1 so that a distal wall 7 of the crossover duct 5 is attached to said vertical edge 8.

In an embodiment, the distal wall 7 of the crossover duct 5 is perpendicular to an outlet wall 9 of the preceding apparatus that comprises the outlet 2. However, in another embodiment, there is an angle differing from 90° between said outer wall 9 and the crossover duct 5.

Figure 6:
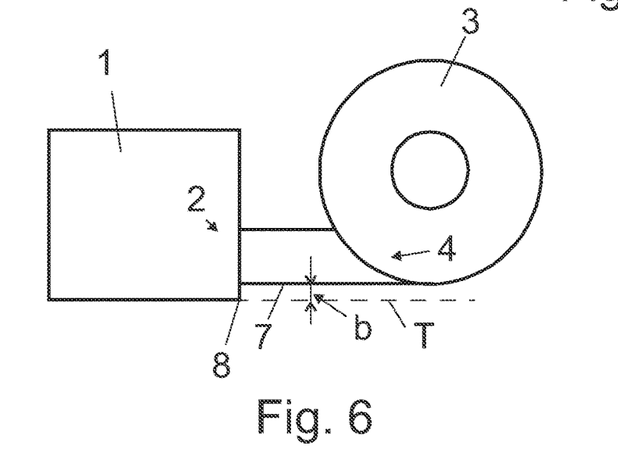
FIG. 6 is a schematic top view of a sixth cyclone separator arrangement in partial cross-section.

FIG. 6 is a schematic top view of a sixth cyclone separator arrangement in partial cross-section. In an embodiment of an arrangement where the preceding apparatus 1 has a polygon shape, the distal wall 7 of the crossover duct 5 has an offset b in respect of a vertical edge 8 of the preceding apparatus 1. In an embodiment, said offset b is not more than 0.1×D from said vertical edge 8.

Figure 7A:
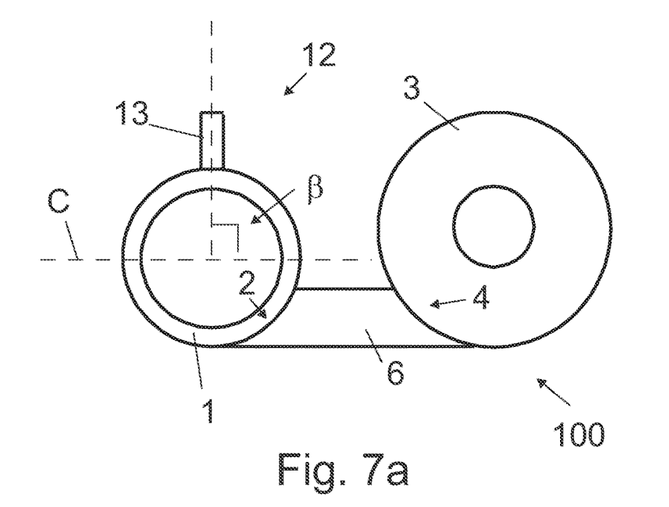
FIG. 7a is a schematic top view of a seventh cyclone separator arrangement in partial cross-section.
Figure 7B:
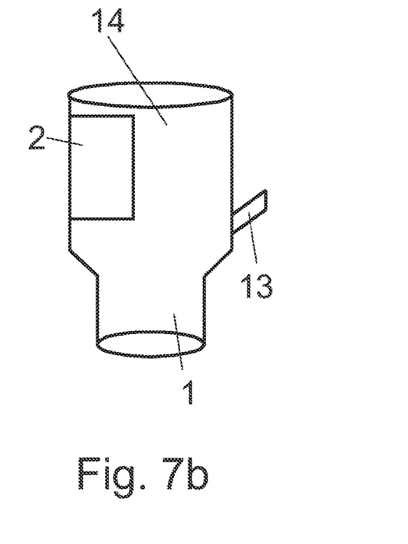
FIG. 7b is a schematic side view of the arrangement shown in FIG. 7a in partial cross-section.

FIG. 7a is a schematic top view of a seventh cyclone separator arrangement in partial cross-section, and FIG. 7b is a schematic side view of the arrangement shown in FIG. 7a in partial cross-section.

In an embodiment, the preceding apparatus 1 is a venturi apparatus. The venturi apparatus 1 has a round cross-section, and it comprises a feeding channel arrangement 12 that is arranged for feeding material in the venturi apparatus. From a fluid dynamic perspective, the round cross-section of the venturi apparatus 1 may be preferable. However, in other embodiments, the cross-section of the venturi apparatus 1 may have another geometry, such as an oval or a polygon geometry.

In an embodiment, the venturi apparatus 1 has an expanded upper portion 14, and the outlet 2 is arranged to said expanded upper portion. In an embodiment, the expanded upper portion 14 is arranged symmetrically in relation to the overall structure of the venture apparatus. Some embodiments having symmetrical upper portion are shown in FIGS. 7a-8b.

In an embodiment, the feeding channel arrangement 12 of the venturi apparatus comprises one feeding channel 13 that is arranged, as seen from above, at a second angle β in relation to the direction of the distal wall 7 of the crossover duct 5. In an embodiment, the second angle β is 90°. In an embodiment, the second angle β is selected in range of 90°+70°.

In an embodiment, such as shown in FIG. 7a, the feeding channel arrangement 12 is arranged on opposite side of a centre line C of the venturi apparatus as the crossover duct 5.

Figure 8A:
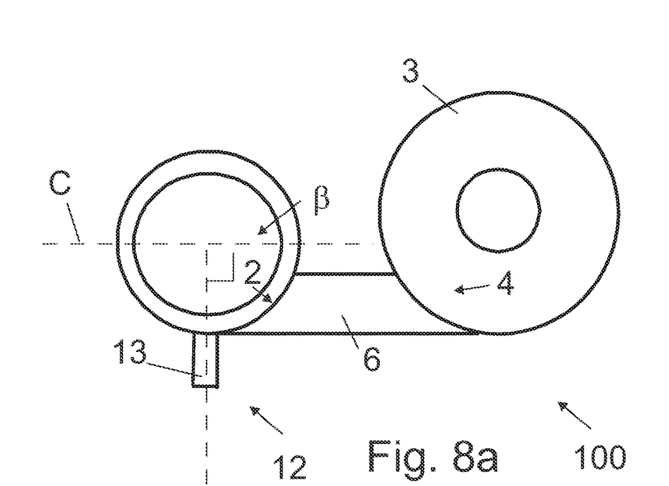
FIG. 8a is a schematic top view of an eighth cyclone separator arrangement in partial cross-section.
Figure 8B:
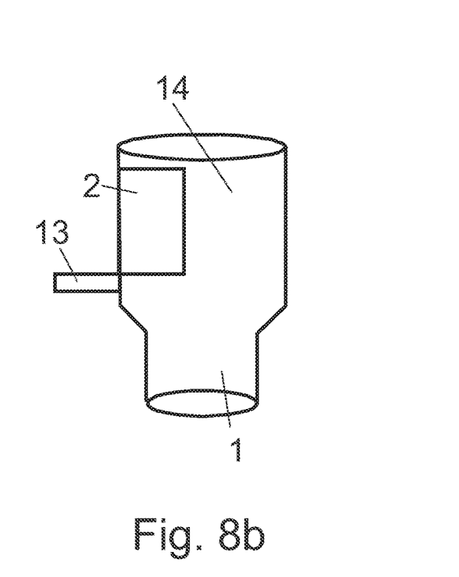
FIG. 8b is a schematic side view of the arrangement shown in FIG. 8a in partial cross-section.

FIG. 8a is a schematic top view of an eighth cyclone separator arrangement in partial cross-section, and FIG. 8b is a schematic side view of the arrangement shown in FIG. 8a in partial cross-section.

In an embodiment, such as shown in FIG. 8a, the feeding channel arrangement 12 is arranged on same side of a centre line C of the venturi apparatus as the crossover duct 5. Also in this embodiment, the second angle β is selected in range of 90°+70°.

Figure 9A:
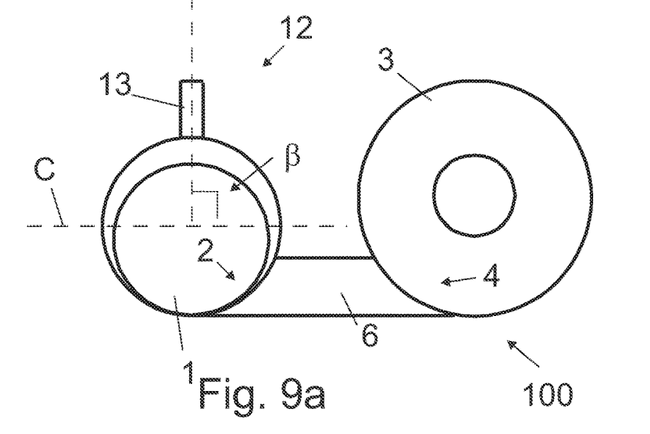
FIG. 9a is a schematic top view of a ninth cyclone separator arrangement in partial cross-section.
Figure 9B:
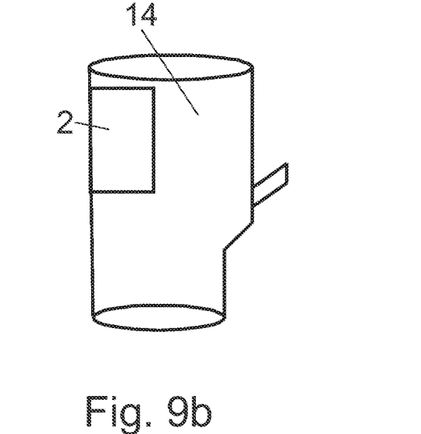
FIG. 9b is a schematic side view of the arrangement shown in FIG. 9a in partial cross-section.

FIG. 9a is a schematic top view of a ninth cyclone separator arrangement in partial cross-section, FIG. 9b is a schematic side view of the arrangement shown in FIG. 9a in partial cross-section.

In an embodiment, the venturi apparatus 1 has an expanded upper portion 14 that is arranged asymmetrically in relation to the overall structure of the venture apparatus.

Some embodiments having asymmetrical upper portion are shown in FIGS. 9a-12. The outlet 2 is arranged to said expanded upper portion.

Figures 10A, 10B, 11, 12:
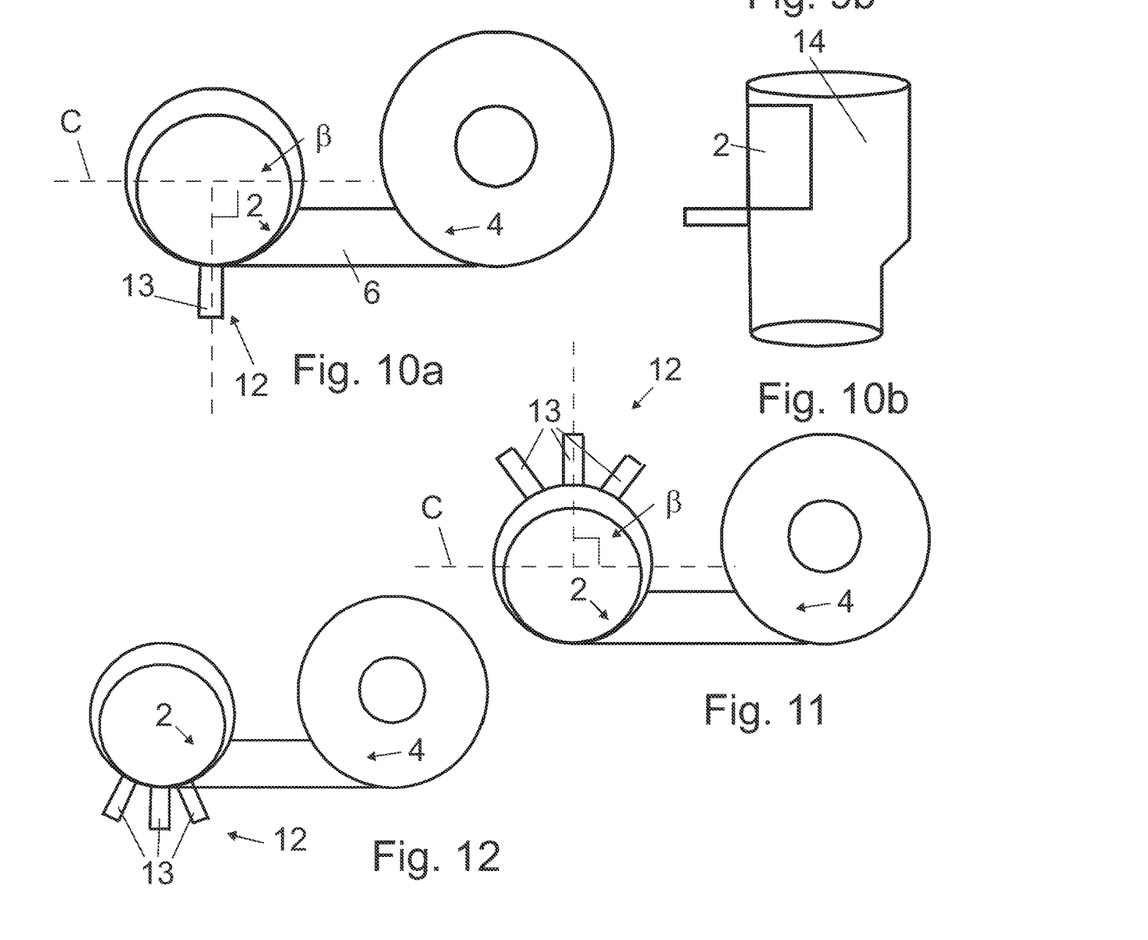
FIG. 10a is a schematic top view of a tenth cyclone separator arrangement in partial cross-section.
FIG. 10b is a schematic side view of the arrangement shown in FIG. 10a in partial cross-section.
FIG. 11 is a schematic top view of an eleventh cyclone separator arrangement in partial cross-section.
FIG. 12 is a schematic top view of a twelfth cyclone separator arrangement in partial cross-section.

In an embodiment comprising asymmetrical venturi apparatus 1, the feeding channel arrangement 12 is arranged on opposite side of a centre line C of the venturi apparatus as the crossover duct 5, as shown in FIGS. 9a, 9b. In another embodiment, the feeding channel arrangement 12 is arranged on same side of a centre line C of the venturi apparatus as the crossover duct 5, as shown in FIGS. 10a, 10b. The centre line C is the centre line of the upper portion.

FIG. 11 is a schematic top view of an eleventh cyclone separator arrangement in partial cross-section, and FIG. 12 is a schematic top view of a twelfth cyclone separator arrangement in partial cross-section.

In an embodiment, the feeding channel arrangement 12 comprises at least two feeding channels 13. The embodiments shown in FIGS. 11 and 12 there are three feeding channels in the arrangement. The number of the feeding channels 13 may be even higher than three.

In an embodiment, the feeding channels 13 of the feeding channel arrangement 12 of the venturi apparatus are arranged in a second angle β in relation to the direction of the distal wall 7 of the crossover duct 5, the second angle β being selected in range of 90°+70°.

FIG. 13a is showing principles for defining for defining values of d and H of a flow channel, and FIG. 13b is showing principles for defining value D of a preceding apparatus. Said definition is based on the concept of the centre of gravity. The centre of gravity CF of the flow channel 6 and the preceding apparatus 1 can be calculated by a simplified piecewise element to get the centre of gravity of a two-dimensional area as follows:

$$x_s = \frac{\sum_i (x_{s,i} \cdot A_i)}{\sum_i A_i} \quad \text{Equation 1}$$

$$y_s = \frac{\sum_i (y_{s,i} \cdot A_i)}{\sum_i A_i}$$

As the centre of gravity CF of the flow channel 6 has been determined, a line intersecting said centre CF and parallel to the height of the preceding apparatus 1 is defined. This line represents the height H of the flow channel 6. Then, another line intersecting said centre CF but orthogonal to the height H of the preceding apparatus 1 is defined. This another line represents the width d of the flow channel 6.

When defining value D of the preceding apparatus 1, it is determined the centre of gravity CP of the flow-through area of the preceding component 1. This determination may take place as described in Equation 1 above. Then a line that intersects said centre CP and is parallel to the d defined above is defined. This defined line represents the inner diameter D of the preceding component 1.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 preceding apparatus
2 outlet
3 cyclone separator
4 inlet
5 crossover duct
6 flow channel
7 distal wall
8 vertical edge
9 outlet wall
10 proximal wall
11 bump
12 feeding channel arrangement
13 feeding channel
14 expended upper portion
α first angle
β second angle
b offset
C centre line
CF centre of gravity of the flow channel
CP centre of gravity of the preceding apparatus
D inner diameter
d width
H height
h height of bump
T tangential plane

The invention claimed is:
1. A cyclone separator arrangement, comprising:
a preceding apparatus having an outlet, and
a cyclone separator having an inlet, the arrangement further comprising
a crossover duct connected to the outlet and the inlet for supplying gas flow comprising particles from the preceding apparatus to the cyclone separator, wherein
the crossover duct creates a flow channel from the outlet to the inlet, the horizontal cross-section of the preceding apparatus has a round shape having a horizontal inner diameter (D), and
wherein
the width (d) is a dimension of the flow channel in a horizontal plane crossing the centre of gravity (CF) of a flow-through area of the flow channel at the outlet of the preceding apparatus,
wherein
the inner diameter (D) is a width of the preceding apparatus in a horizontal plane crossing the centre of gravity (CP) of a flow-through area of the preceding apparatus and being parallel to the width (d) of the flow channel, and that
the flow channel is arranged asymmetrically in a horizontal cross-section of the preceding apparatus,
wherein
the flow channel having a cross-section having a height (H) and a width (d), said width (d) relating to the inner diameter (D) such that 0.15×D<d<0.6×D, in that
the crossover duct is arranged to the round preceding apparatus so that a distal wall of the crossover duct is tangentially directed in respect of the preceding apparatus, and in that
a relation of the height (H) of the crossover duct to the width (d) thereof is H/d<3.75 at the outlet.

2. The arrangement as claimed in claim 1, wherein the cross-sectional area of the crossover duct decreases towards the inlet.

3. The arrangement as claimed in claim 2, wherein the width (d) of the crossover duct is decreasing towards the inlet.

4. The arrangement as claimed in claim 3, wherein a proximal wall of the crossover duct is arranged at a first angle ($\alpha$) in relation to a distal wall thereof, wherein the first angle $\alpha<40°$.

5. The arrangement as claimed in claim 1, wherein a bump is arranged in the flow channel for limiting the cross-sectional area of the flow channel.

6. The arrangement as claimed in claim 5, wherein height (h) of the bump in relation to width (d) of the flow channel is selected as: $h/d<0.3$.

7. The arrangement as claimed in claim 6, wherein length (l) of the bump in relation to height (h) thereof is selected as: $l/h<4$.

8. The arrangement as claimed in claim 1, wherein the preceding apparatus is one of the following: a reactor, a furnace, an oven, a venturi.

9. The arrangement as claimed in claim 8, wherein the preceding apparatus is a venturi apparatus having a round cross-section, the venturi apparatus comprising:

a feeding channel arrangement for feeding material in the venturi apparatus, wherein the feeding channel arrangement comprises one or more feeding channel(s) arranged, as seen from above, at a second angle ($\beta$) in relation to the direction of the distal wall of the crossover duct, wherein said second angle ($\beta$) is selected in range of $90°\pm70°$.

10. The arrangement as claimed in claim 9, wherein the feeding channel arrangement comprises one feeding channel only.

11. The arrangement as claimed in claim 9, wherein the feeding channel arrangement comprises at least two feeding channels.

12. The arrangement as claimed in claim 9, wherein the feeding channel arrangement is arranged on same side of a centre line (C) of the venturi apparatus as the crossover duct.

13. The arrangement as claimed in claim 9, wherein the feeding channel arrangement is arranged on opposite side of a centre line (C) of the venturi apparatus as the crossover duct.

14. The arrangement as claimed in claim 9, wherein the venturi apparatus has an expanded upper portion, and that the outlet is arranged to said expanded upper portion.

\* \* \* \* \*